(12) United States Patent
Shaked et al.

(10) Patent No.: US 6,682,173 B1
(45) Date of Patent: Jan. 27, 2004

(54) SYMPTOMATIC REDUCTION OF BANDING ARTIFACTS

(75) Inventors: Doron Shaked, Haifa (IL); Omer Gila, Cupertino, CA (US); Rodney Shaw, Aptos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/290,927

(22) Filed: Nov. 8, 2002

(51) Int. Cl.[7] .............................. B41J 2/21; B41J 29/393
(52) U.S. Cl. ............................................. 347/43; 347/19
(58) Field of Search .............................. 347/43, 19, 37; 358/1.8, 504

(56) References Cited

U.S. PATENT DOCUMENTS 6,137,592 A * 10/2000 Arquilevich et al. ......... 358/1.8
6,494,558 B1 * 12/2002 Doval et al. ................... 347/19

* cited by examiner

*Primary Examiner*—Thinh Nguyen

(57) ABSTRACT

A digital image is reproduced by printing a set of test patterns with a print engine that produces banding artifacts; generating a parametric artifact model of the banding artifacts in the prints of the test patterns; modifying the digital image with the parametric artifact model; and using the print engine to make prints of the modified digital image. The modifications cause a reduction in visibility of banding artifacts in the prints of the modified digital image.

30 Claims, 4 Drawing Sheets

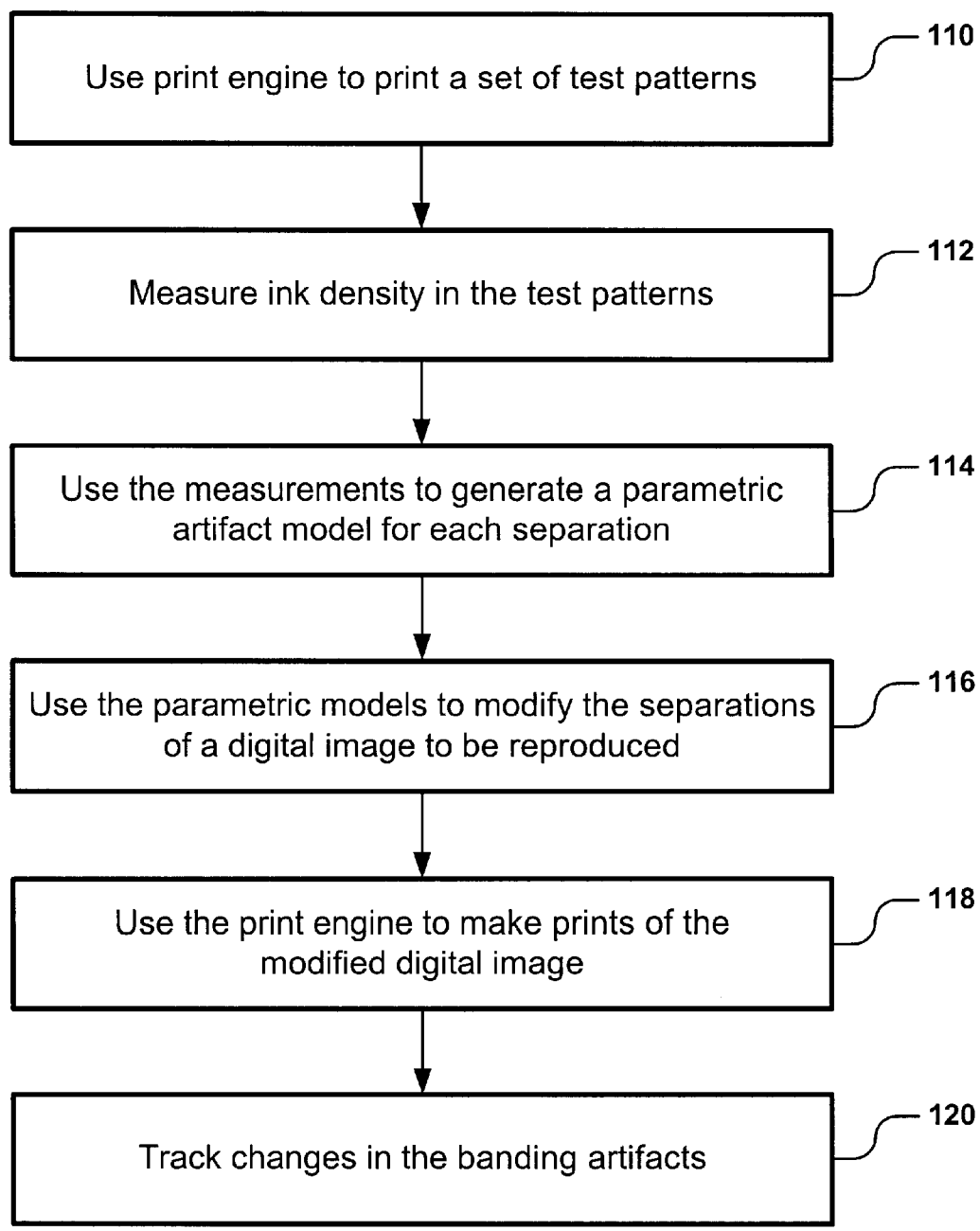

SYMPTOMATIC REDUCTION OF BANDING ARTIFACTS

BACKGROUND

The HP Indigo line of digital printing presses is based on digital offset color technology, which combines ink-on-paper quality with multicolored printing on a wide range of paper, foil and plastic substrates These digital printing presses offer short-run printing, on-demand service and personalization, all at an affordable price.

Banding artifacts are visually noticeable tone fluctuations that usually appear as horizontal or vertical stripes across prints. Banding artifacts made by digital printing presses can appear as dark bands across smooth mid ink-load patches located at impact zones on the prints. These banding artifacts are undesirable, as they can degrade quality of the prints.

Possible causes of banding artifacts in digital printing presses include process speed variations, machine vibrations, drum impact, and other mechanical, physical, chemical, environmental, and algorithmic instabilities. Visibility of the banding artifacts can be reduced by identifying and correcting the cause or causes of the banding artifacts.

SUMMARY

Visibility of banding artifacts can be reduced by correcting the symptom instead of the cause. According to one aspect of the present invention, a digital image is reproduced by printing a set of test patterns with a print engine that produces banding artifacts; generating a parametric artifact model of the banding artifacts in the prints of the test patterns; modifying the digital image with the parametric artifact model, and using the print engine to make prints of the modified digital image. The modifications cause a reduction in visibility of banding artifacts in the prints of the modified digital image.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is an illustration of a method of reducing the visibility of banding artifacts in accordance with an embodiment of the present invention.

DETAILED DESCRIPTION

Figure 2A:
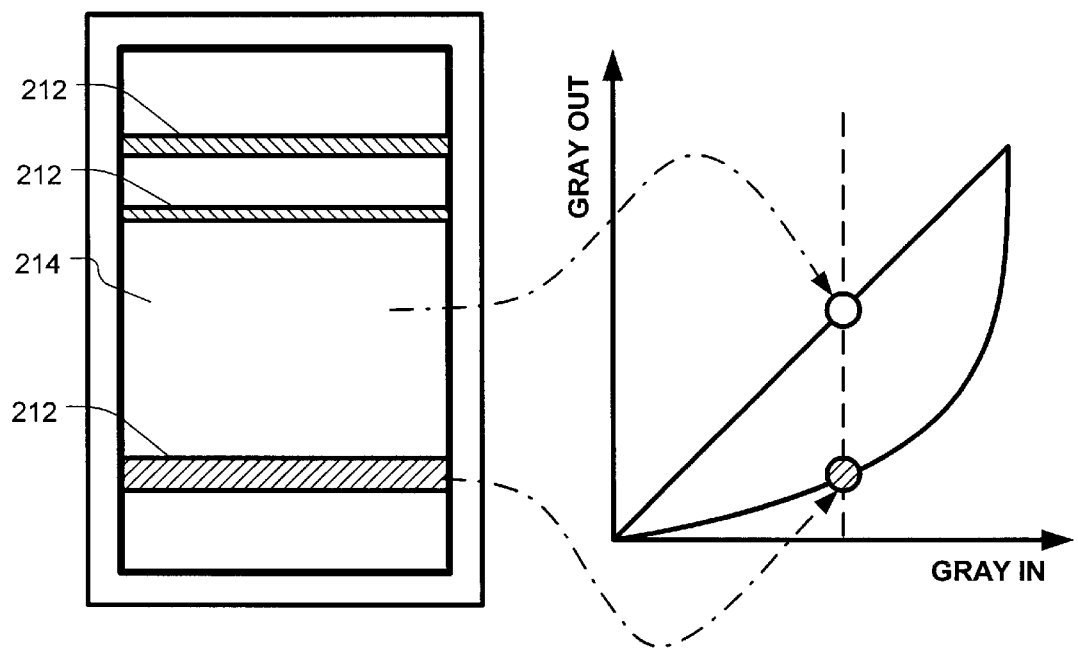
FIG. 2a is an illustration of an exemplary print having impact bands.

As shown in the drawings for purposes of illustration, the present invention is embodied in a method for reducing the visibility of banding artifacts in prints produced by a liquid electrophotography print engine. The method addresses the symptom of banding artifacts, rather than the cause. The method is especially effective for reducing the visibility of the banding artifacts in prints made by digital printing presses and other machines in which the cause of the banding artifacts is difficult to identify or correct.

The print engine uses multiple colors of ink. For example, a four-ink print engine might print with cyan (C), magenta (M), yellow (Y) and black (K) inks. A seven-ink print engine might also print with light cyan, light magenta, and spot color.

Reference is made to FIG. 1, which illustrates a method for reproducing a digital image. The print engine is used to print a set of test patterns (110). The test patterns may contain, without limitation, constant patches of inks in various ink densities on the same or different sheets, constant patches of ink in the same density at the same spatial locations on a sequence of sheets, density patches of ink on different print media, etc. A ramp is an example of a test pattern. In a ramp, ink density gradually changes across the sheet. The ramp is preferably oriented perpendicular to the artifacts. Thus the ramp should change (increase or decrease) in a vertical detection if the artifacts extend in a horizontal direction. The set may include different test patterns. One test pattern may be printed per sheet.

The same test pattern may be printed for each of the color separations. Thus a four-ink printer may make at least four prints of the same test pattern. In the test patterns, lighter ink separations are preferably printed using darker ink, since artifacts printed with the lighter inks (e.g., cyan, yellow) are more difficult to detect. Black ink is preferably used instead of the lighter inks.

For example, the set includes four groups of test patterns. The test patterns are large rectangles. Each group corresponds to a different color separation. The first, second, third and fourth groups correspond to black, cyan, magenta, and yellow separations, respectively. Each group contains different test patterns. Black ink used for each separation: Thus the different test patterns in the first group are rendered in black ink; the different patterns in the second group are rendered in black ink (instead of cyan ink), the different patterns in the third group are rendered in black ink (instead of magenta ink), and the different patterns in the fourth group are rendered in black ink (instead of yellow ink). Thus each group appears to have the same prints, even though they are different. The prints of the test patterns will allow banding artifacts in each separation to be identified and modeled.

FIG. 2a shows a simple example of a print 210 of a test pattern. A large rectangular patch of a single process color is printed at constant ink density. Because of imperfections in the print engine, this print has horizontal bands 212. The background 214 is a constant ink density of the process color, and the band appears as a different shade of that process color. For example, the background 214 might be a light gray, and the impact band 212 might be a dark gray or black.

Figure 3:
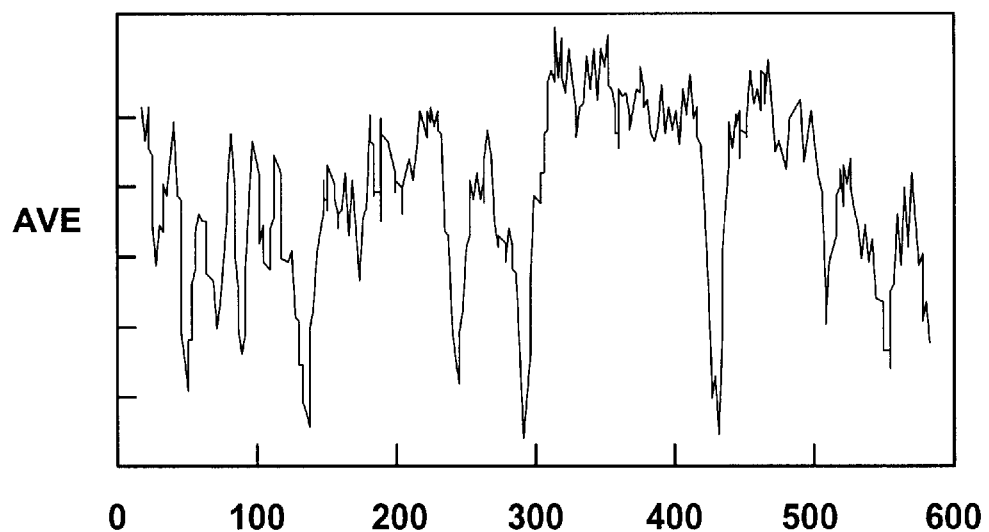
FIG. 3 is an exemplary profile of color variation in a color patch that is printed by a digital printing press.

In a more realistic print of a test pattern, additional bands of differing ink density would appear. FIG. 3 provides a more realistic example of color variation in a solid color patch that is printed by a digital printing press. The graph of FIG. 3 represents an average ink density measurement along the artifact direction as a function of perpendicular location. AVG denotes the average ink density across the print and across all prints of the same test pattern.

In the case of digital printing presses, the bands tend to have a constant location from print to print. Depth or darkness of the bands typically varies from print to print (that is, the banding artifacts vary over time). For example, if one hundred test patterns are printed, the banding artifacts tend to appear at the same location on each print, but the ink density of the artifacts will differ from print to print.

Thus the location of a banding artifact from a digital printing press is usually stable from print to print; however, its average ink density changes are only partly predictable from print to print. Other characteristics of a banding artifact might be partly predictable (i.e., stable and non-random). For example, the change in ink density along the length or width of the banding artifact might be partly predictable. Changes over long time ranges and long print runs (e.g., during warm-up of the printing press) may also be partly predictable. Some or all of these partly predictable characteristics are used (112–116) to reduce the visibility of the banding artifacts in subsequent prints made by the digital printing press.

Ink density in each print of test patterns is measured (112). Ink density of an entire print may be measured. In the alternative, locations of the artifacts can be identified (e.g., by visual inspection, by computer analysis of the prints), and the ink density of each artifact is measured.

As a first example, the prints of the test patterns are scanned by a scanner, whereby a digital image is produced for each print. It is determined (or assumed) that the prints contain rows of banding artifacts. For each row of each digital image, a statistical average of ink density is determined by summing the pixel values in the row, and dividing the sum by the number of pixels in the row.

As a second example, the prints of the test patterns are scanned, whereby pixel values of each row are produced. Locations of banding artifacts are determined. It is also determined that the change in ink density along a row is predictable. For each artifact of each digital image, a curve describing the change in ink density along the length of each banding artifact is fitted to the pixel values.

As a third example, the locations of the artifacts are identified, and the bias of the artifacts is measured. Each artifact is considered a random signal with a non-zero average. This non-zero average is statistically estimated from the set of prints of the same test pattern.

A densitometer may be used in place of a scanner. The densitometer would typically measure a thin strip along a sheet (across the artifacts).

The various separations may be processed separately such that a measurement is made for each separation.

The measurements are used to generate parametric artifact models of the artifacts (114). One model may be generated for each separation. Each model may be represented as the function $PR_s(x)$, where x is the location of the artifact and $PR_s(x)$ is its amplitude in the $s^{th}$ separation. For example, the function $PR_s(x)$ may be generated by averaging profiles from the different test patterns. The functions $PR_s(x)$ will be used as a predictor of banding artifacts in each separation of subsequent prints.

A function other than $PR_s(x)$ may be used. For example, a function $PR_s(x,t)$ would describe amplitude as a function of location and time. A function $PR_s(x,g)$ would describe amplitude as a function of location and input gray value or ink load.

Figure 2B:
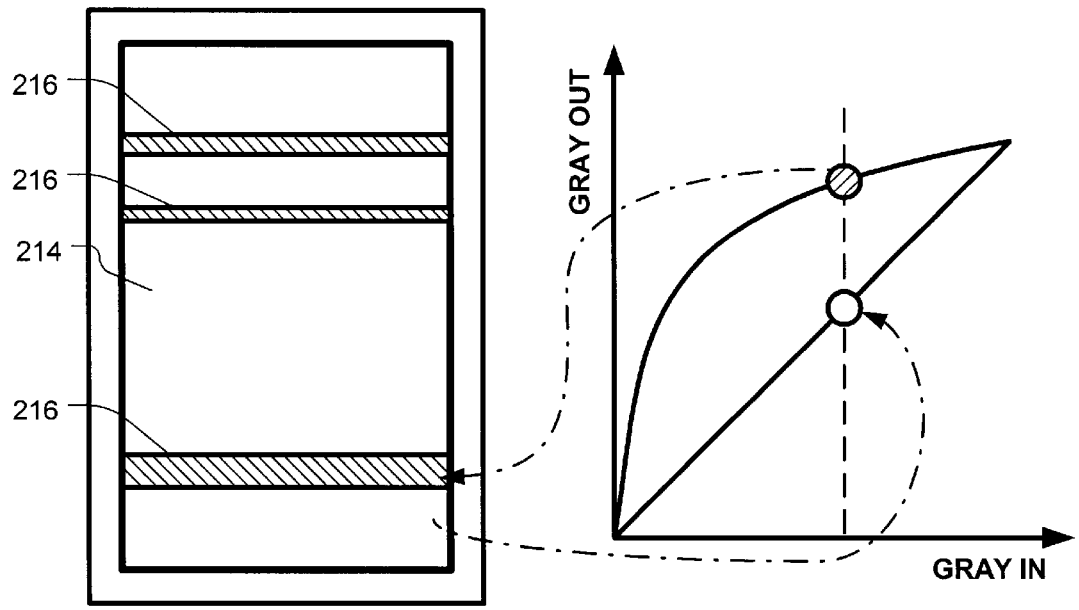
FIG. 2b is an illustration of compensating the exemplary print for the impact bands.

The digital image to be reproduced in the subsequent prints is modified with the parametric artifact model (116). For example, the digital image is separated into its separations, and the models are used to modify the tone of the separations at the expected locations of the banding artifacts. Consequently, the print engine will be instructed to print inverses of the artifacts at the artifact locations. An inverse would be a lighter color at the location of a darker band, or a darker color at the location of a lighter band. Inverses 216 of an artifact are illustrated in FIG. 2b.

When the modified digital image is printed, the tone of the background should be produced at the artifact location. However, residual error is expected to remain due to variability in the artifact. The residual error can be reduced by dithering the banding artifacts. The dithering is performed by adding random noise at the locations of the residual bands. Provided that the residual bands correlate with the original band locations, the function $PR_s(x+\Delta)$ may be used instead of $PR_s(x)$, where $\Delta$ is a random number within an appropriate range (e.g. ±1 mm). The function $PR_s(x+\Delta)$ may add the random noise only where necessary.

Figure 4:
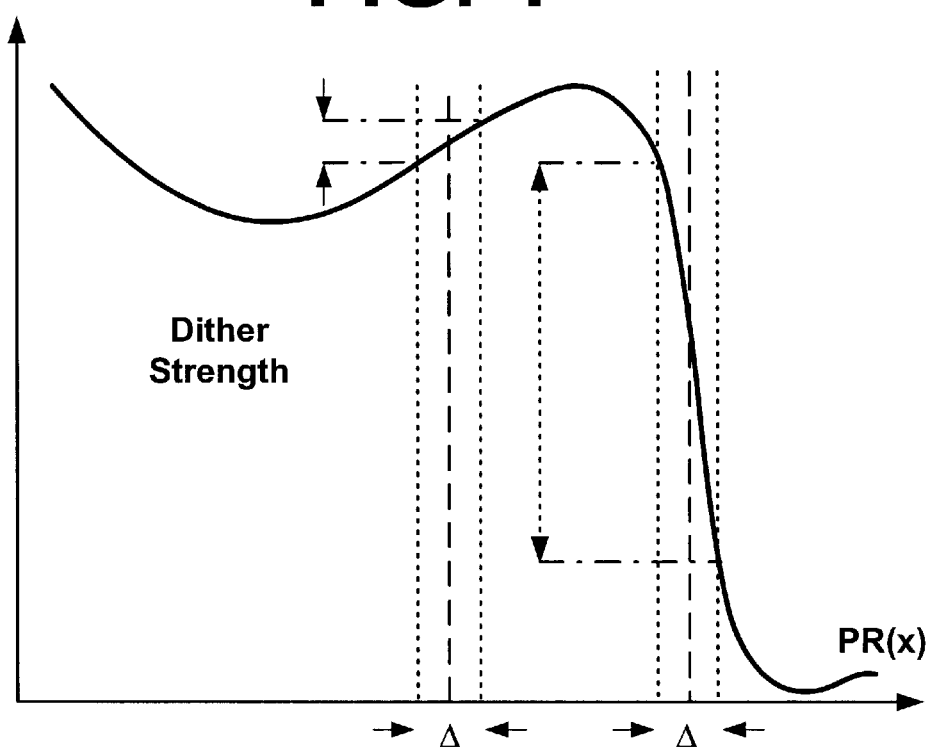
FIG. 4 is an illustration of dither strength.

An illustration of exemplary dither strength is illustrated in FIG. 4. The artifacts are characterized by a high gradient in the function $PR_s(x)$ Since residual error correlates with the artifacts, a stronger dither is performed at the locations of the artifacts. The function $PR_s(x+\Delta)$ has larger deviations from $PR_s(x)$ near areas where the function $PR_s(x)$ has a stronger gradient.

The modified digital image is sent to the print engine, which makes a set of prints (118). Whereas the prints of the test patterns are used for artifact measurement and modeling, the prints of the modified digital image may be displayed, published, or otherwise distributed.

The artifacts may repeat predictably across different ink loads and time. If they do, the same profile can be used for the appropriate ink loads and prints in the prints of the digital image.

During operation of the print engine, profiles of the artifacts can change. For example, the banding artifacts might drift slowly in time, or the banding artifacts might change if a component of the print engine is replaced.

The modified digital image may be further modified to account for these changes (120). Feedback information may be obtained to determine whether the profiles change over time. Once changes are ascertained, a new the parametric artifact model may be generated, and the digital image may be modified with the new parametric artifact model.

Changes for drift may be determined by printing test patterns on or in addition to the prints of the modified digital image. These test patterns can then be analyzed for changes in the banding artifacts.

Thus described is a method for reducing visibility of the banding artifacts. The visibility is reduced without addressing the root causes in the print engine. Instead, the method corrects the symptoms.

Figure 5:
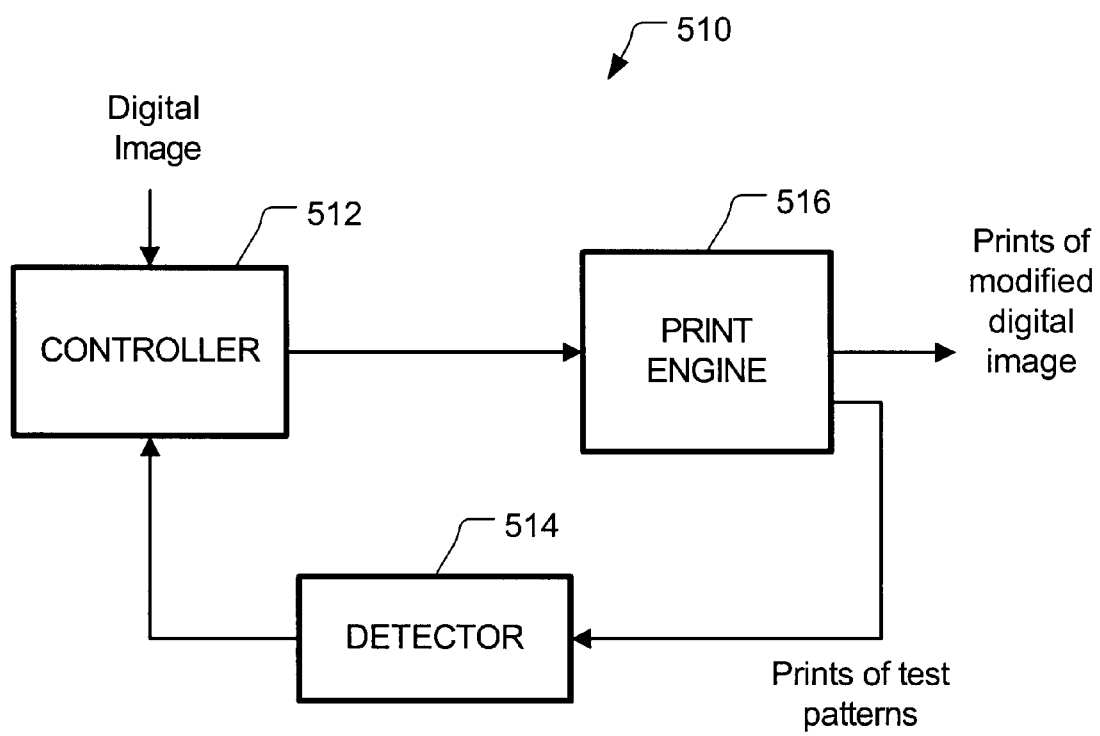
FIG. 5 is an illustration of a hardware implementation of the method of FIG. 1.

FIG. 5 illustrates an exemplary hardware implementation 510 of the method just described. The hardware implementation 510 includes a controller 512, a detector 514, and a print engine 516. As a first example, a computer is programmed to function as the controller 512, and the detector 514 is a scanner. The computer supplies test patterns to the print engine 516. The resulting prints are scanned by the scanner, and the resulting digital images are supplied to the computer. The computer uses pixel values in the digital images to make measurements of the artifacts; uses the measurements to model the banding artifacts in each separation, uses the models to modify a digital image to be reproduced, and sends the modified digital image to the print engine 516.

As a second example of the hardware implementation, the controller 512 is an ASIC, and the image analyzer 514 is a densitometer. The ASIC, the densitometer and the print engine 516 are part of a digital printing press. The ASIC instructs the print engine 516 to print a set of test patterns. Strips of these prints are scanned by the densitometer. Ink density values are sent by the densitometer to the ASIC. The ASIC uses the ink density values to generate a parametric artifact model for each separation. An image source (not shown) sends a digital image to the ASIC, which modifies the digital image with the parametric artifact model, and sends the modified digital image to the print engine 516.

The processor 512 could use a pipeline of lookup tables (LUTs) to modify the digital image. One lookup table (LUT) may be used for each separation. The lookup table for the $s^{th}$ separation may be created as $LUT_s(x,g)=g-PR_s(x,g)$, where g denotes the input gray level, and x denotes the location.

If dithering is used to modify the digital image, the table LUT(x+Δ,g) may be indexed by a randomized location, where Δ is randomized for each pixel. Using such an LUT, the pixel value changes randomly along the length of the artifact. Randomized Δs may be used for every pixel in the artifact correction zone, which may cover the entire image or a portion of the image.

The method is not limited to any particular hardware implementation. The parametric artifact models may be applied by means other than lookup tables. The measurements may be made by means other than scanners and densitometers. The print engine may be a liquid electrophotography engine, a laserjet engine, or any other print engine that produces banding artifacts. The processing may be performed entirely by a standalone machine (such as a computer), entirely by a processor in the image analyzer, or it may be distributed among different machines.

The method is not limited to any particular application. A digital printing press is but one example. The present invention may be applied to digital copiers and other machines having liquid electrophotography print engines.

The present invention is not limited to the specific embodiments described and illustrated above. Instead, the present invention is construed according to the claims that follow.

What is claimed is:

1. A method for reproducing a digital image, the method comprising:

printing a set of test patterns with a print engine that produces banding artifacts;

generating a parametric artifact model of the banding artifacts in the prints of the test patterns;

modifying the digital image with the parametric artifact model; and using the print engine to make prints of the modified digital image;

the modifications causing a reduction in visibility of banding artifacts in the prints of the modified digital image.

2. The method of claim 1, wherein the parametric artifact model is made from measurements of ink density in the set of test patterns.

3. The method of claim 2, wherein the measurements are statistical measurements across the prints of the test patterns.

4. The method of claim 2, wherein the artifact measurements are average ink densities.

5. The method of claim 1, wherein the modification creates inverses of the artifacts at the corresponding artifact locations.

6. The method of claim 1, wherein the prints of the modified digital image are dithered at banding artifact locations.

7. The method of claim 1, wherein separations of the print engine are measured and processed separately.

8. The method of claim 7, wherein lighter separations are measured with darker ink.

9. The method of claim 1, further comprising tracking changes in the artifacts in the prints of the modified digital image.

10. Apparatus comprising:
    a print engine; and
    a controller for causing the print engine to print a set of test patterns;
    the controller generating a parametric artifact model of banding artifacts in the test patterns;
    the controller using the parametric artifact model to compensate for the artifacts in subsequent prints made by the print engine.

11. The apparatus of claim 10, wherein the parametric artifact model is made from measurements of ink density in the test patterns.

12. The apparatus of claim 11, wherein the measurements are average ink densities across the test patterns.

13. The apparatus of claim 10, wherein the apparatus compensates for the artifacts by subtracting the parametric artifact model at corresponding artifact locations.

14. The apparatus of claim 10, wherein the subsequent prints are dithered at artifact locations.

15. The apparatus of claim 10, wherein separations of the print engine are measured and processed separately.

16. The apparatus of claim 15, wherein lighter separations are measured with darker ink.

17. The apparatus of claim 10, further comprising a densitometer for measuring ink density of the test patterns, the ink density measurements used to generate and track the parametric artifact model.

18. Apparatus comprising:
    a liquid electrophotography print engine;
    first means for generating a parametric artifact model of banding artifacts in test patterns printed by the print engine; and
    second means for using the parametric artifact model to cause a reduction in visibility of banding artifacts in subsequent prints made by the print engine.

19. Apparatus for a liquid electrophotography print engine, the apparatus comprising a processor for measure banding artifacts in a first set of prints produced by the print engine, and for using the measurements to generate a parametric artifact model that compensates each color separation for banding artifacts in subsequent prints made by the print engine.

20. The apparatus of claim 19, wherein the parametric artifact model is made from measurements of ink density in the test patterns.

21. The apparatus of claim 20, wherein the measurements are average ink densities across prints of the first set.

22. The apparatus of claim 19, wherein the compensation includes inverting the artifacts at corresponding artifact locations.

23. The apparatus of claim 19, wherein the subsequent prints are dithered at banding artifact locations.

24. The apparatus of claim 19, wherein separations of the print engine are measured and processed separately.

25. The apparatus of claim 24, wherein lighter separations are measured with darker ink.

26. An article for a processor of a liquid electrophotography print engine, the article comprising memory programmed to instruct the processor to measure banding artifacts in a set of test patterns printed by the print engine; and use the measurements to generate a parametric artifact model that compensates each color separation for banding artifacts in subsequent prints made by the print engine.

27. The article of claim 26, wherein the parametric artifact model is made from measurements of ink density in the test patterns.

28. The article of claim 27, wherein the measurements are average ink densities across prints of the first set.

29. The article of claim 26, wherein the compensation includes inverting the artifacts at corresponding artifact locations.

30. The article of claim 26, wherein the subsequent prints are dithered at banding artifact locations.

* * * * *